(12) United States Patent  
Bailey et al.

(10) Patent No.: US 8,261,554 B2
(45) Date of Patent: Sep. 11, 2012

(54) FUEL NOZZLE TIP ASSEMBLY

(75) Inventors: Donald Mark Bailey, Simpsonville, SC (US); Scott R. Simmons, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 951 days.

(21) Appl. No.: 12/212,576

(22) Filed: Sep. 17, 2008

(65) Prior Publication Data

US 2010/0064690 A1     Mar. 18, 2010

(51) Int. Cl.
*F02C 1/00* (2006.01)

(52) U.S. Cl. .......................................... 60/740; 60/741

(58) Field of Classification Search .................. 60/740, 60/741

See application file for complete search history.

(56) References Cited

U.S. PATENT DOCUMENTS

| | | | |
|---|---|---|---|
| 4,850,196 A * | 7/1989 | Scalzo et al. | 60/740 |
| 6,460,326 B2 * | 10/2002 | Bechtel et al. | 60/39.465 |
| 7,216,594 B2 * | 5/2007 | Nowak et al. | 110/261 |
| 7,290,394 B2 * | 11/2007 | Lehtinen | 60/800 |
| 7,654,000 B2 * | 2/2010 | Prociw et al. | 29/890.142 |
| 2007/0119183 A1 * | 5/2007 | Evulet | 60/804 |

* cited by examiner

*Primary Examiner* — Ehud Gartenberg
*Assistant Examiner* — Arun Goyal
(74) *Attorney, Agent, or Firm* — Fletcher Yoder, P.C.

(57) ABSTRACT

A system, in one embodiment, includes a fuel nozzle tip retainer that includes a structural member having a geometry that blocks a tip insert from moving axially downstream of a fuel nozzle.

21 Claims, 7 Drawing Sheets

FUEL NOZZLE TIP ASSEMBLY

BACKGROUND OF THE INVENTION

The present disclosure relates generally to a system and arrangement for a fuel nozzle of a gas turbine engine and, more specifically, to an arrangement for a fuel nozzle tip and its components.

Gas turbine engines spin a turbine by producing pressurized gas that flows through the turbine. Pressurized gas is produced by burning a fuel such as propane, natural gas, kerosene or jet fuel, which is burned after being injected into a combustor or combustion chamber by a set of fuel nozzles. Fuel nozzles include several components, including a tip assembly. The fuel nozzle tip may be subjected to a load from compressed gas that flows through the tip in a downstream direction toward a combustor. Components of the nozzle tip may become detached due to wear and tear on the nozzle. For example, a brazed joint may potentially sever and allow the nozzle tip to flow downstream. Although a joint severance may be unlikely, the potential damage from such a joint severance can be substantial if the nozzle tip passes into the turbine.

BRIEF DESCRIPTION OF THE INVENTION

A system, in one embodiment, includes a fuel nozzle tip retainer that includes a structural member having a geometry that blocks a tip insert from moving axially downstream of a fuel nozzle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, various embodiments of fuel nozzle systems may be employed to improve the performance of a turbine engine system. In particular, an embodiment includes a fuel nozzle tip, which includes a tubular tip and an insert. In certain embodiments, the fuel nozzle tip includes an axial retention feature, such as an axial abutment structure, to block axial movement of the tip insert in a downstream direction. For example, the tubular tip and the tip insert may interface, via a shoulder, to retain the insert, thereby blocking it from moving in an axial direction. In particular, the extreme temperatures experienced by the nozzle tip components due to the ignition of the fuel nearby in the nozzle may cause failure of a retaining braze in the nozzle tip. Without a secondary retention mechanism, such as a shoulder, in the tip insert, the nozzle tip components may potentially become dislodged and flow downstream, causing damage to turbine blades. Downtime and repair or replacement due to turbine blade damage may be costly for a turbine operator.

Figure 1:
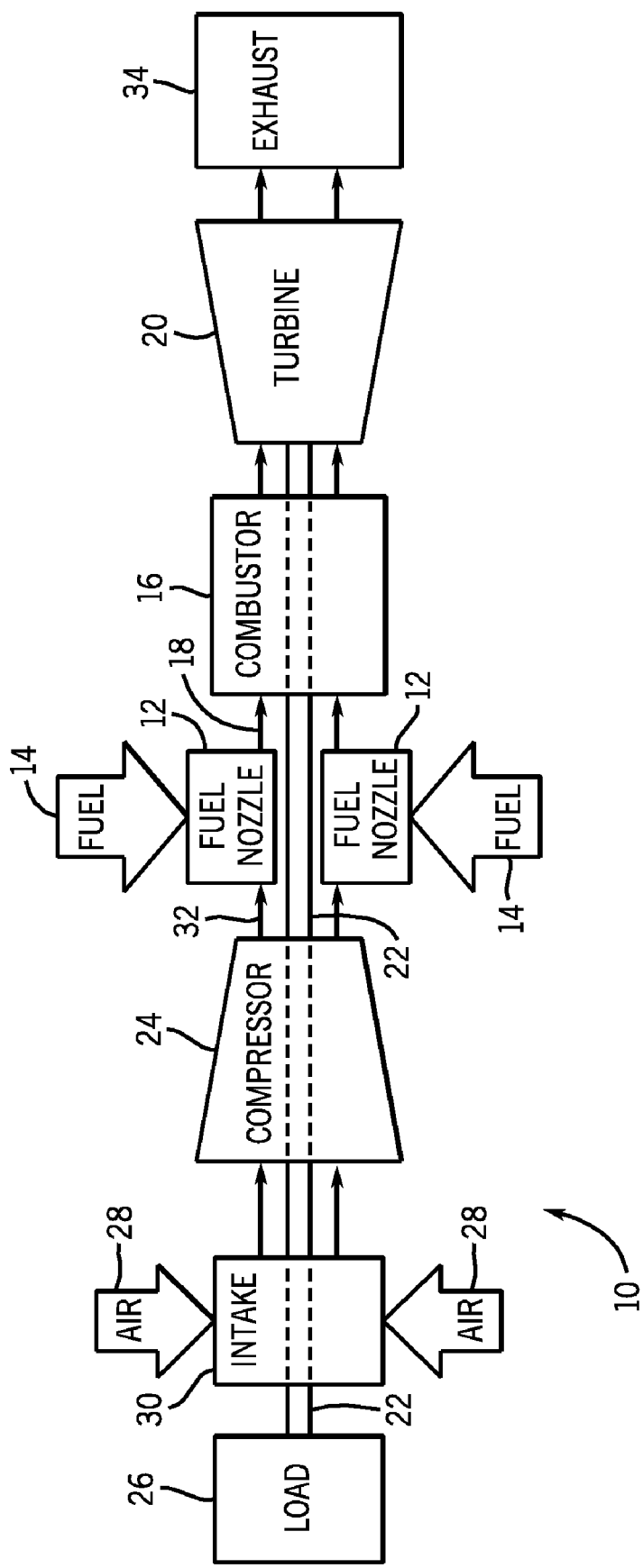
FIG. 1 is a block diagram of a turbine system having a fuel nozzle coupled to a combustor in accordance with an embodiment of the present technique.

Turning now to the drawings and referring first to FIG. 1, a block diagram of an embodiment of a turbine system 10 is illustrated. The diagram includes fuel nozzle 12, fuel supply 14, and combustor 16. As depicted, fuel supply 14 routes a liquid fuel or gas fuel, such as natural gas, to the turbine system 10 through fuel nozzle 12 into combustor 16. After mixing with pressurized air, shown by arrow 18, ignition occurs in combustor 16 and the resultant exhaust gas causes blades within turbine 20 to rotate. The coupling between blades in turbine 20 and shaft 22 will cause rotation of shaft 22, which is also coupled to several components throughout the turbine system 10, as illustrated. For example, the illustrated shaft 22 is drivingly coupled to a compressor 24 and a load 26. As appreciated, load 26 may be any suitable device that may generate power via the rotational output of turbine system 10, such as a power generation plant or a vehicle.

Air supply 28 may route air via conduits to air intake 30, which then routes the air into compressor 24. Compressor 24 includes a plurality of blades drivingly coupled to shaft 22, thereby compressing air from air intake 30 and routing it to fuel nozzles 12 and combustor 16, as indicated by arrows 32. Fuel nozzle 12 may then mix the pressurized air and fuel, shown by numeral 18, to produce an optimal mix ratio for combustion, e.g., a combustion that causes the fuel to more completely burn so as not to waste fuel or cause excess emissions. After passing through turbine 20, the exhaust gases exit the system at exhaust outlet 34. As discussed in detail below, an embodiment of turbine system 10 includes certain structures and components within fuel nozzle 12 to improve the axial retention, thereby improving safety and reducing potential downtime due to detached nozzle components.

Figure 2:
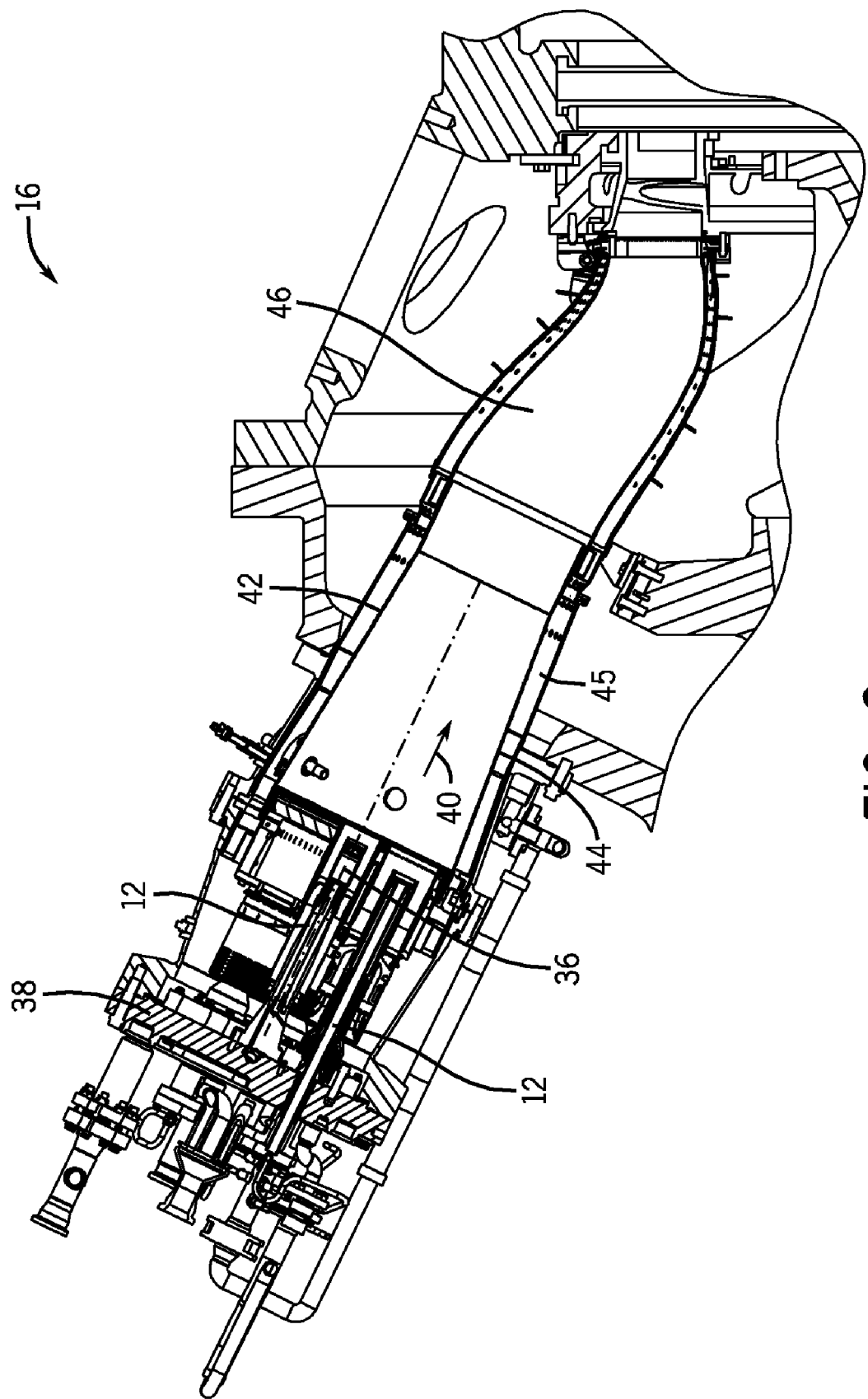
FIG. 2 is a cutaway side view of the combustor, as shown in FIG. 1, with a plurality of fuel nozzles coupled to an end cover in accordance with an embodiment of the present technique.

FIG. 2 shows a cutaway side view of an embodiment of combustor 16 having a plurality of fuel nozzles 12. As depicted, each fuel nozzle 12 includes a fuel nozzle tip 36 with unique axial retention features (e.g., axial abutment or blocking feature) to block any potential axial movement of tip components in a downstream direction. In an embodiment, combustor 16 may feature five or more fuel nozzles 12 that may be mounted to end cover 38, which is located at the base of combustor 16. End cover 38 may include conduits or channels that route fuel and pressurized gas to each fuel nozzle 12. Each fuel nozzle 12 facilitates mixture of pressurized air and fuel into combustor 16 in direction 40. The air fuel mixture then combusts in the combustor 16, thereby creating hot pressurized exhaust gases, which drive the rotation of blades within turbine 20. Combustor 16 includes a flow sleeve 42 and a liner 44 surrounding the combustion zone. In certain embodiments, flow sleeve 42 and liner 44 are coaxial with one another to define a hollow annular space 45, which may enable passage of air for cooling and entry into the combustion zone (e.g., via perforations in liner 44). Liner 44 also may be designed to control the flow and speed of the air fuel mixture and hot exhaust gases downstream in direction 40 toward transition piece 46. For example, the air fuel mixture may exit each fuel nozzle tip 36 in direction 40, wherein the mixture ignites as it enters combustor liner 44 causing pressurized exhaust gas to be routed downstream 40 through transition piece 46 into turbine 20. As appreciated, the ignition of an air fuel mixture near fuel nozzle tip 36 may cause wear and tear due to heat radiation on the nozzle 12 components. For example, if a component of fuel nozzle tip 36 becomes dislodged due to wear, the tip component may flow downstream 40, causing costly damage to blades and other components of turbine 20. Thus, as discussed below, each fuel nozzle tip 36 is positively secured via unique axial retention features.

Figure 3:
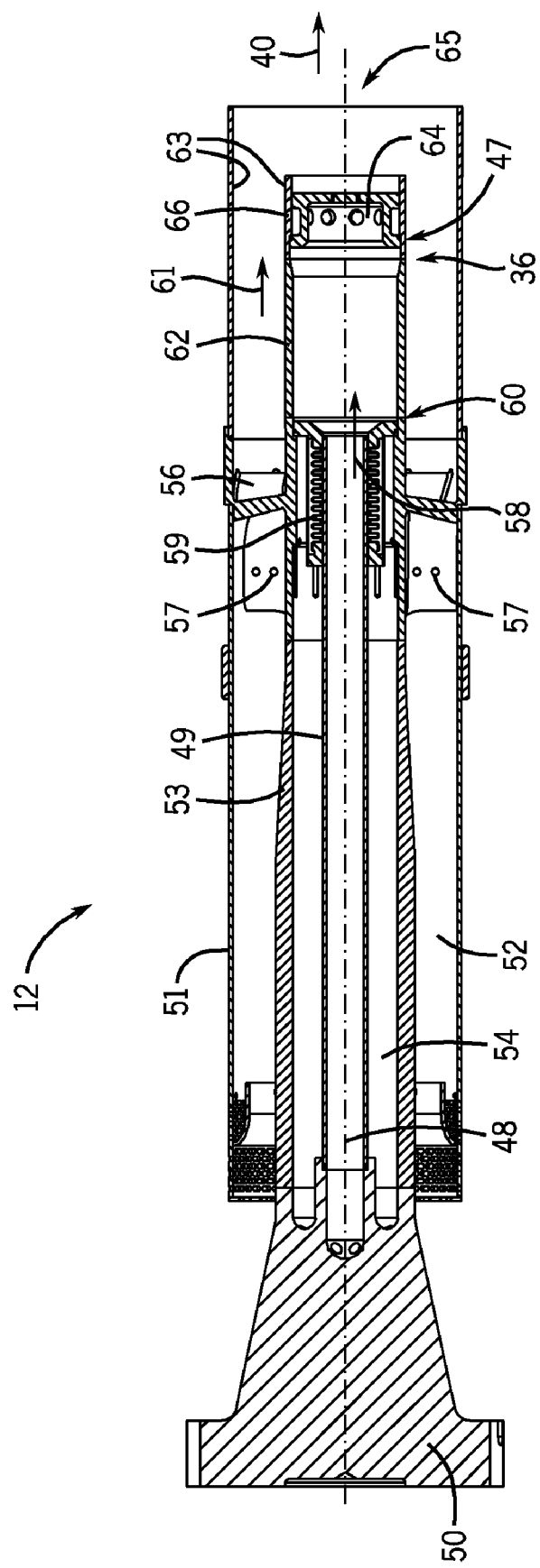
FIG. 3 is an assembled sectional side view of a fuel nozzle, as shown in FIG. 2, with a fuel nozzle tip with axial retention features, in accordance with an embodiment of the present technique.

A cross-section side view of an embodiment of fuel nozzle 12 is shown in FIG. 3. As illustrated and discussed further below, fuel nozzle 12 includes unique axial retention features 47 configured to provide a positive stop or block to prevent undesirable axial movement of components of fuel nozzle tip 36 in downstream direction 40. Fuel nozzle 12 includes flange 50 which may be coupled to end cover 38 via nut and bolt, or other suitable coupling mechanism. Compressed air may be routed from compressor 30 to compressed air passage 48 through end cover 38 and flange 50. Outer tubing 51 may be described as a flow conditioner, which conditions pressurized air as it flows downstream within passage 52. As depicted, fuel nozzle 12 also includes compressed air passage 52 and fuel passage 54. Passages 48, 52 and 54 are arranged coaxial with one another, and thus are annular in shape. As illustrated, passages 48, 52, and 54 are defined by inner tubing 49, outer tubing 51, and intermediate tubing 53. Fuel from fuel passage 54 supplies swozzle 56 via vane holes 57. Pressurized air flows in direction 58, through bellows tube 59, which draws the air into fuel nozzle tip 36. Air may be routed from air passage 52 through swozzle 56 where the air is mixed with fuel. Swozzle 56 includes vanes to create a swirling effect around fuel nozzle 12 to facilitate flow of the air as it flows downstream 61. In addition, a nozzle tube tip component 62, may be welded or brazed 60 to a base surface within fuel nozzle 12, thereby mounting the structure. As air exits a tube tip, a swirling air fuel mixture, caused by swozzle 56, flows and mixes with the air. In particular, the design of swozzle 56 enhances flow and mixture of the fuel air mixture toward combustor 16, thereby reducing or preventing attachment of the air fuel mixture to inner walls 63 of the nozzle 12.

In an embodiment, fuel nozzle tip 36 includes a tube tip 62, a diffusion tip insert 64 and tube tip end piece 66. The flow of pressurized air in direction 58 may produce a stress on diffusion tip insert 64, which may be retained by axial retention features 47 of tube tip 62 and tip end piece 66, as will be discussed in detail below. As air exits fuel nozzle tip 36, the air fuel mixture may ignite near the exit of nozzle 12, indicated by element 65. As appreciated, tube tip 62, tip end piece 66, and diffusion tip insert 64 may be part of a nozzle 12 assembly for both gas and liquid fuel turbine systems. As illustrated, tube tip 62 is coupled to, swozzle 56 as indicated by interface 60.

Figure 4:
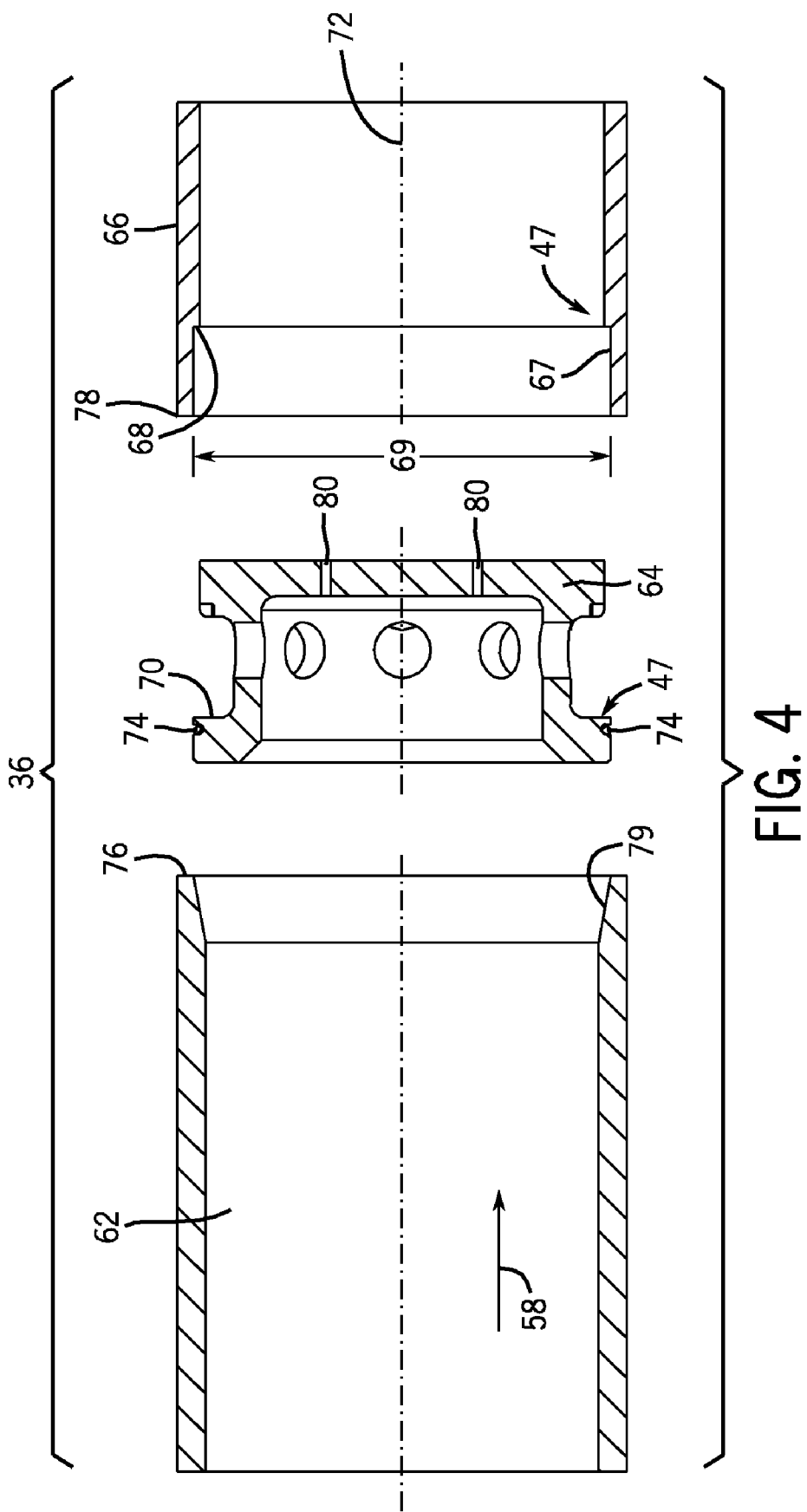
FIG. 4 is an exploded sectional side view of the fuel nozzle tip as shown in FIG. 3, with a tip insert, a nozzle tip tube, and a shoulder to provide axial retention of the tip insert in accordance with an embodiment of the present technique.

FIG. 4 is an exploded cross-section side view showing an embodiment of fuel nozzle tip 36 with axial retention features 47. As shown, tube tip end piece 66 includes end piece shoulder 68. An inner annular surface 67 of end piece shoulder 68 has a diameter 69 that is larger than the diameter of the inner annular surface of the rest of tube tip end piece 66, thereby creating shoulder 68. Thus, shoulder 68 has an annular shape configured to provide an axial abutment surface to function as a positive axial stop. For example, end piece shoulder 68 is configured to receive insert interface shoulder 70, thereby providing a positive axial retention of diffusion tip insert 64 to prevent axial movement in direction 58. Shoulders 68 and 70 may be described as outer and inner annular shoulders, respectively. In addition, these portions of fuel nozzle tip 36, including shoulders 68 and 70 may be referred to as a fuel nozzle tip retainer. As appreciated, the pressure of air flow in direction 58, along nozzle axis 72, towards combustion chamber 16 creates an axial force against diffusion tip insert 64 in direction 58. Braze location 74 may also provide a retention mechanism to keep tip insert located within tube tip end piece 66. As appreciated, an appropriate braze 74 may couple the tip 64 within the assembly. However, braze 74 does not provide a positive stop like the axial interface/abutment between shoulders 68 and 70. For example, if only braze 74 existed between tube tip end piece 66 and diffusion tip insert 64 (e.g., without shoulders 68 and 70), then diffusion tip insert 64 could pass in the downstream direction 58 if the braze 74 becomes severed.

In an embodiment, the end piece shoulder 68 and insert interface shoulder 70 may be referred to as a secondary retaining mechanism, thus blocking diffusion tip insert 64 from traveling downstream 58 in the event of a failure of braze 74. Further, after placement of diffusion tip insert 64 within tube tip end piece 66, tube tip 62 may coupled to tube tip end piece 66 via an electron beam weld or other suitable bonding or fabrication process, between locations 76 and 78 of fuel nozzle tip assembly 36. An embodiment of nozzle tip 36 also includes tapered annular surface 79, which may facilitate welding and provide an axial stop upstream of the diffusion tip insert 64. Together, tapered annular surface 79 and shoulders 68 and 70 block axial movement in opposite directions, thereby axially capturing the insert 64. In other embodiments, nozzle tip 36 does not include a braze 74, where shoulders 68 and 70 are the primary retention members for diffusion tube tip insert 64. In addition, weld or braze 74 may be separate or independent from the interface at shoulders 68 and 70. However, some embodiments may include a weld or braze 74 directly at the interface of shoulders 68 and 70.

Figure 5:
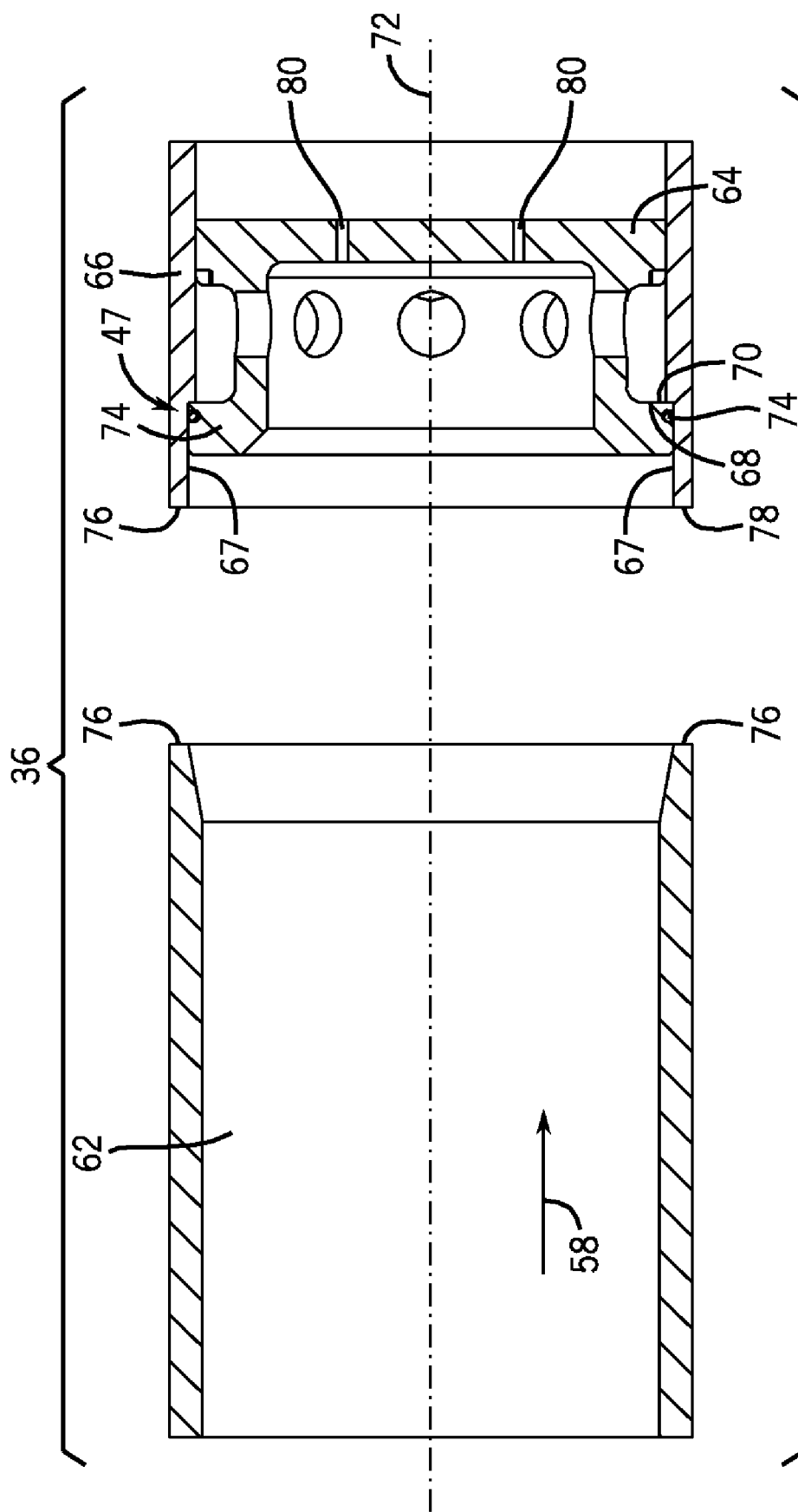
FIG. 5 is an exploded sectional side view of the fuel nozzle tip, as shown in FIG. 4, that has been partially assembled, in accordance with an embodiment of the present technique.

FIG. 5 is an illustration of an exploded sectional side view of an embodiment of fuel nozzle 36 as shown in FIG. 4, which has been partially assembled. In the diagram, diffusion tip insert 64 has been placed inside tube tip end piece 66 where braze 74 attaches diffusion tip insert 64 to inner annular surface 67. Further, in the event of a braze 74 failure, axial tip retention is provided by the positive interface between end piece shoulder 68 and insert interface shoulder 70. Again, shoulders 68 and 70 axially abut one another to provide a positive stop unlike braze 74, which can potentially sever over time as a result of thermal stresses and cracking. As illustrated, inner annular surface 67 and shoulder 68 may be described as an annular groove, which receives and retains annular protrusion (e.g., shoulder 70) of diffusion tip insert 64. This axial interface blocks axial movement of diffusion tip insert 64 even if (i.e., as a secondary catch) braze 74 fails. Diffusion tip insert 64 includes holes 80 which enable air distribution or exit in direction 58 through the end of fuel nozzle tip 36. In an embodiment, diffusion tip insert 64 and tube tip end piece 66 are composed of a nickel alloy, which is able to withstand the high temperatures associated with combustion downstream of the fuel nozzle 36. Further, tube tip 62 may be composed of a stainless steel alloy, which is less expensive than a nickel alloy, due to the fact that tube tip 62 is not as exposed to the high temperatures of combustion. Thus, an embodiment on fuel nozzle 36 may save manufacturing costs due to use of appropriate materials for the components.

Figure 6:
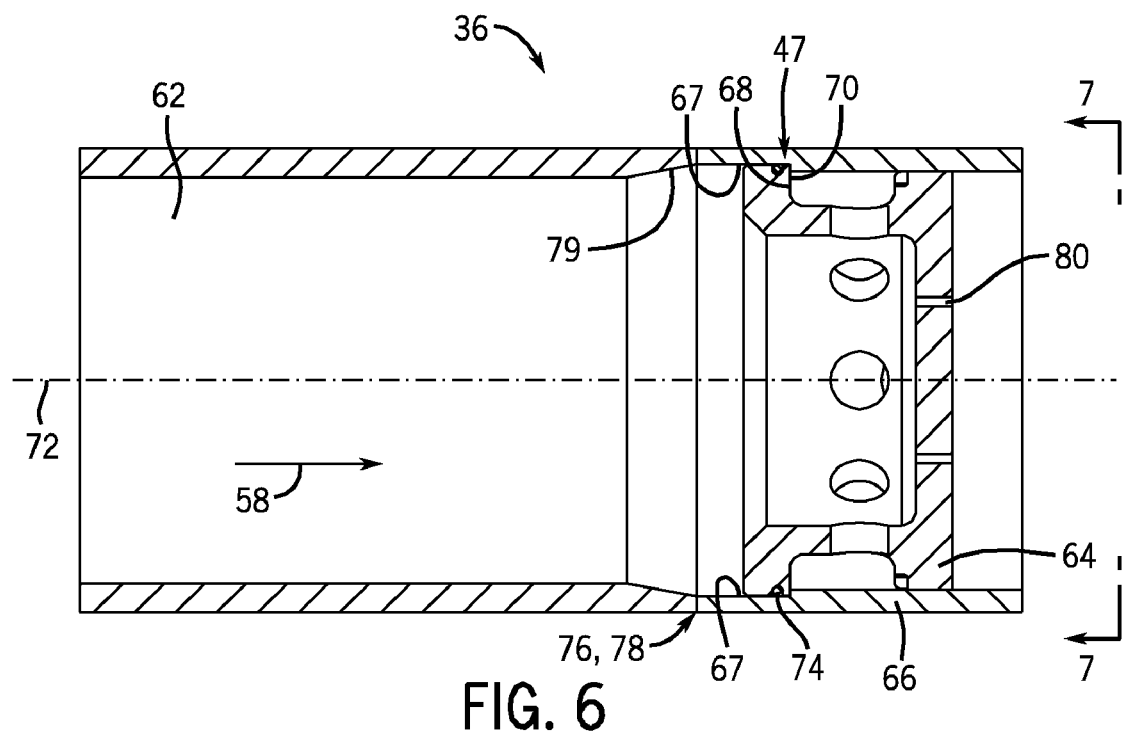
FIG. 6 is a sectional side view of the fuel nozzle tip, as shown in FIGS. 4 and 5, that is fully assembled, in accordance with an embodiment of the present technique.

FIG. 6 illustrates a fully assembled sectional side view of the embodiment shown in FIGS. 4 and 5. The illustration shows an electron beam weld between tube tip 62 and tube tip end piece 66 via electron beam weld at locations 76 and 78. In particular, retention of diffusion tip insert 64 along axis 72 may be provided by the axial interface between end piece shoulder 68 and insert interface shoulder 70 as well as by braze 74. The illustration retention technique, in particular shoulders 68 and 70, block liberation of diffusion tip insert 64 downstream 58 with or without braze 74. In other words, the arrangement blocks diffusion tip insert 64 from traveling downstream in event of a failure of braze 74, thereby preventing costly damage to blades within turbine 20 and costly downtime for turbine system 10. Further, in another embodiment, the shape of end piece shoulder 68 and insert interface shoulder 70 may be different from the illustrated right angle interface. For instance, inner annular surface 67 may be tapered, along with the corresponding mating surface of diffusion tip insert 64, at an angle between 30 and 90 degrees relative to axis 72, thereby providing a tapered interface (e.g., partial conical interface) for braze 74 as a positive retention in axial direction 58. Thus, the axial retention features 47 may provide a positive stop via a 90 degree interface, an angled interface between 0 and 90 degrees, or a combination of multiple different interfaces. A tapered interface may be 30 degrees, 45 degrees, 60 degrees, or some other angle relative to axis 72. In other embodiments, the angle of annular surface 67 and corresponding surface of tip insert 64 may range from 10 degrees up to 60 degrees.

Figure 7:
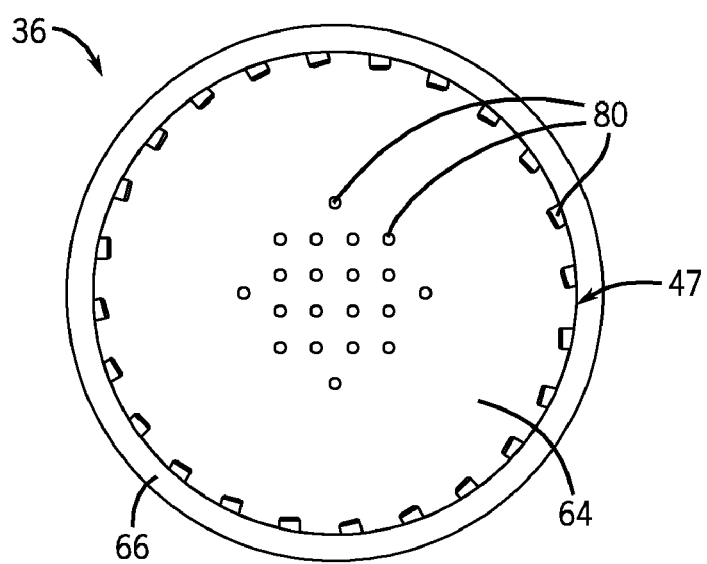
FIG. 7 is an end view of the fuel nozzle tip, as shown in FIGS. 3 through 6 in accordance with an embodiment of the present technique.

FIG. 7 is an illustration of an end view of an embodiment of fuel nozzle tip 36. As depicted, fuel nozzle tip 36 includes air holes 80, which may be located near the center and at peripheral portions of diffusion tip insert 64. In other embodiments, the location, size, and geometry of air holes 80 may vary depending on gas or liquid fuel and various other factors. Air holes 80 may permit air to exit fuel nozzle tip 36 in direction 58 for combustion within combustor 16. As discussed above, embodiments of the diffusion tip insert 64 are retained by an end piece shoulder 68 and insert interface shoulder 70 in the event of a braze 74 failure, thereby preventing the diffusion tip insert 64 from flowing downstream and damaging turbine components.

Figure 8:
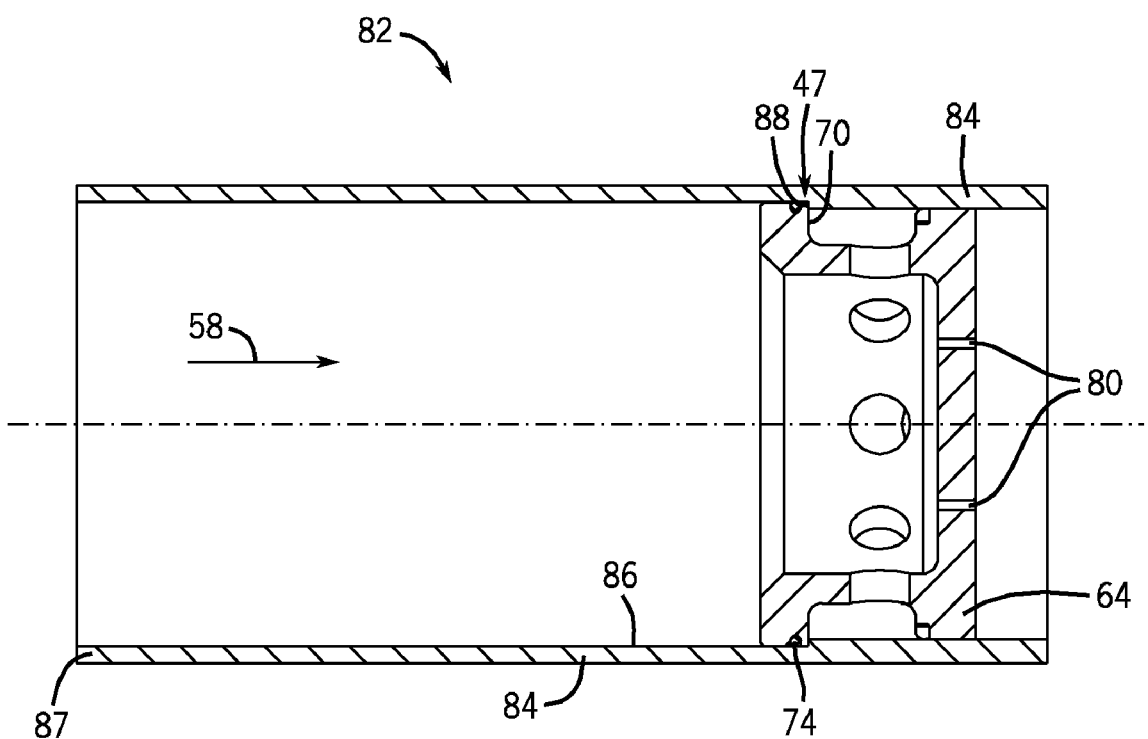
FIG. 8 is a sectional side view of a fuel nozzle tip, with a tip insert and a tip tube having a shoulder interface for axial retention, in accordance with another embodiment of the present technique.

FIG. 8 is an illustration of another embodiment of a fuel nozzle tip 82 having a single-piece construction of tube tip 84.

In particular, tube tip 82 combines tube tip 62 and tube tip end piece 66 of the embodiment of FIGS. 3-7, and enables mounting of diffusion tip insert 64 from left to right. Tube tip 84 may be composed of a nickel alloy to withstand radiation and high temperatures. Diffusion tip insert 64 may also be composed of a nickel alloy. In particular, tube tip 84 contains an annular inner surface having a constant diameter from an upstream end 87 to a tube shoulder 88. Inner surface 86 does not include any slopes or tapering surfaces from left to right until shoulder 88. This arrangement enables diffusion tip insert 64 to be placed through the opening on the upstream end of tube tip 84 until it is retained by tube shoulder 88. For example, during assembly of fuel nozzle tip 82, diffusion tip insert 64 may be inserted into tube tip 84 along direction 58, such that diffusion tip insert 64 may be retained by braze 74 as well as by tube shoulder 88 and insert interface shoulder 70. The depicted embodiment provides a positive retention of diffusion tip insert 64 in the event of a failure of braze 74. As appreciated, the axial retention provided by tube shoulder 88 and insert interface shoulder 70 block diffusion tip insert 64 from being dislodged due to fuel flow forces in direction 58, thereby blocking diffusion tip insert 64 from flowing downstream and damaging costly turbine blades.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A turbine system, comprising:
   a turbine;
   a combustor;
   a compressor; and
   a fuel nozzle, comprising:
      a tubular tip comprising a first tubular portion and a second tubular portion coupled together, wherein the first tubular portion comprises a first axial blocking feature, and the second tubular portion comprises a second axial blocking feature; and
      a diffusion tip insert disposed inside the tubular tip, wherein the diffusion tip insert comprises a plurality of diffusion ports, the plurality of diffusion ports is axially offset from a downstream end of the tubular tip, the first axial blocking feature is configured to block axial movement of the diffusion tip insert in an upstream direction relative to the fuel nozzle, and the second axial blocking feature is configured to block axial movement of the diffusion tip insert in a downstream direction relative to the fuel nozzle.

2. The turbine system of claim 1, wherein the first and second tubular portions are directly fixed to one another.

3. The turbine system of claim 2, wherein the first tubular portion is made of a first material, the second tubular portion is made of a second material, and the second material is configured to withstand higher temperatures than the first material.

4. The turbine system of claim 1, wherein the second axial blocking feature comprises an inner annular shoulder having a first annular surface at a first diameter, a second annular surface at a second diameter, and a third surface between the first and second annular surfaces, wherein the third surface is at an angle of about 90 degrees relative to an axis of the first and second diameters.

5. The turbine system of claim 1, wherein the first axial blocking feature comprises an inner annular tapered surface.

6. The turbine system of claim 1, wherein the turbine system comprises a vehicle or a power generator.

7. The turbine system of claim 1, wherein the fuel nozzle comprises a compressed air passage, a swozzle, a bellows tube, fuel passage, and a flow conditioner.

8. The turbine system of claim 1, wherein the fuel nozzle comprises a braze between the tubular tip and the diffusion tip insert.

9. The turbine system of claim 1, wherein the diffusion tip insert has a first axial end opposite from a second axial end, the first axial end is axially offset from the first axial blocking feature, and the second axial end directly abuts the second axial blocking feature.

10. A turbine system, comprising:
a fuel nozzle tip assembly, comprising:
a tubular tip comprising a first tubular portion and a second tubular portion coupled together, wherein the first tubular portion comprises a first axial blocking feature, and the second tubular portion comprises a second axial blocking feature; and
a tip insert disposed inside the tubular tip, wherein the tip insert comprises a plurality of diffusion ports, the plurality of diffusion ports is axially offset from a downstream end of the tubular tip, the first axial blocking feature is configured to block axial movement of the tip insert in a first axial direction, and the second axial blocking feature is configured to block axial movement of the tip insert in a second axial direction opposite to the first axial direction.

11. The turbine system of claim 10, wherein the fuel nozzle tip assembly comprises a weld or braze between the tip insert and the tubular tip.

12. The turbine system of claim 10, wherein the first and second axial blocking features do not include a weld or braze.

13. The turbine system of claim 10, wherein the first and second tubular portions are directly fixed to one another, the first tubular portion is made of a first material, the second tubular portion is made of a second material, and the second material is configured to withstand higher temperatures than the first material.

14. The turbine system of claim 10, wherein the first and second tubular portions directly axially abut one another.

15. The turbine system of claim 14, wherein the first axial blocking feature comprises an inner annular tapered surface and the second axial blocking feature comprises an inner annular shoulder.

16. The turbine system of claim 10, comprising a fuel nozzle having the fuel nozzle tip assembly, a turbine engine having the fuel nozzle tip assembly, or a combination thereof.

17. A turbine system, comprising:
a fuel nozzle tip assembly, comprising:
a tubular tip comprising a first tubular portion and a second tubular portion directly fixed to one another, wherein the first tubular portion is made of a first material, the second tubular portion is made of a second material, the second material is configured to withstand higher temperatures than the first material, and at least one of the first and second tubular portions comprises an axial blocking feature; and
a diffusion tip insert disposed inside the tubular tip, wherein the diffusion tip insert comprises a plurality of diffusion ports, the plurality of diffusion ports is axially offset from a downstream end of the tubular tip, and the axial blocking feature is configured to block axial movement of the tip insert.

18. The turbine system of claim 17, wherein the plurality of diffusion ports comprises a first plurality of axial holes and a second plurality of crosswise holes relative to a longitudinal axis of the fuel nozzle tip assembly.

19. The turbine system of claim 17, wherein the first tubular portion comprises a first axial blocking feature configured to block axial movement of the tip insert in a first axial direction, and the second tubular portion comprises a second axial blocking feature configured to block axial movement of the tip insert in a second axial direction opposite to the first axial direction.

20. The turbine system of claim 19, wherein the diffusion tip insert has a first axial end opposite from a second axial end, the first axial end is axially offset from the first axial blocking feature, and the second axial end directly abuts the second axial blocking feature.

21. The turbine system of claim 17, comprising a fuel nozzle having the fuel nozzle tip assembly, a turbine engine having the fuel nozzle tip assembly, or a combination thereof.

* * * * *